No. 825,487. PATENTED JULY 10, 1906.
A. M. SAUNDERS.
APPARATUS FOR THE MANUFACTURE OF PIPE.
APPLICATION FILED JAN. 23, 1904.
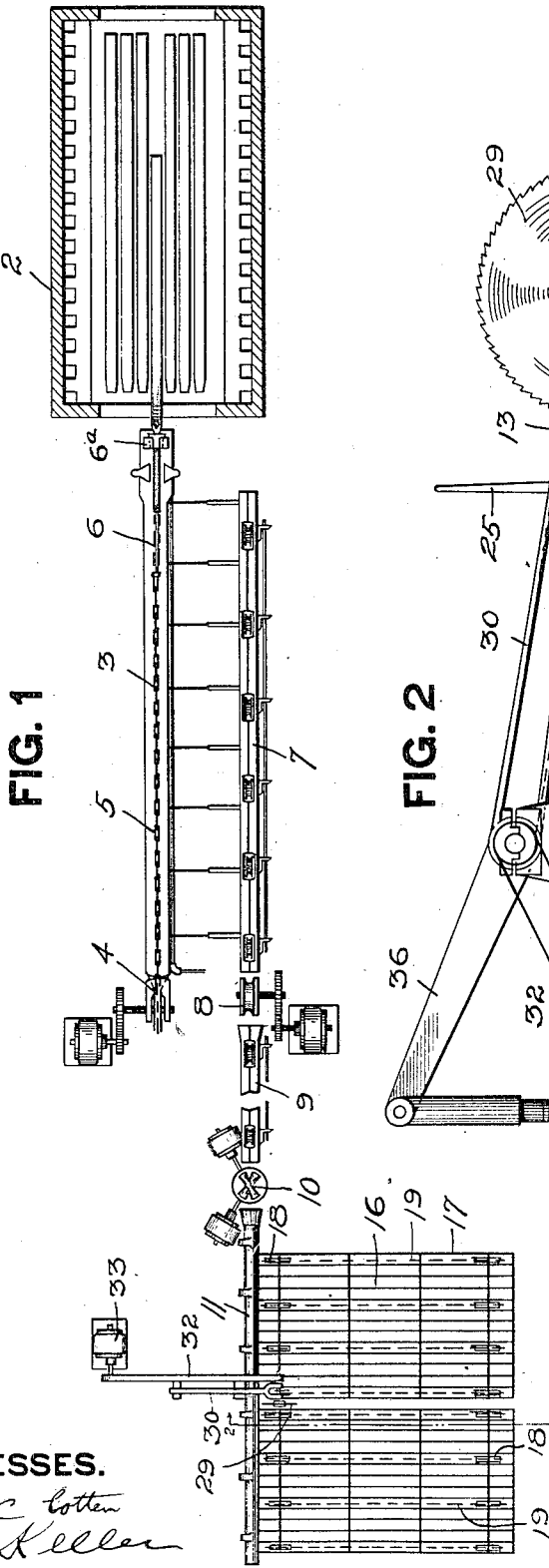
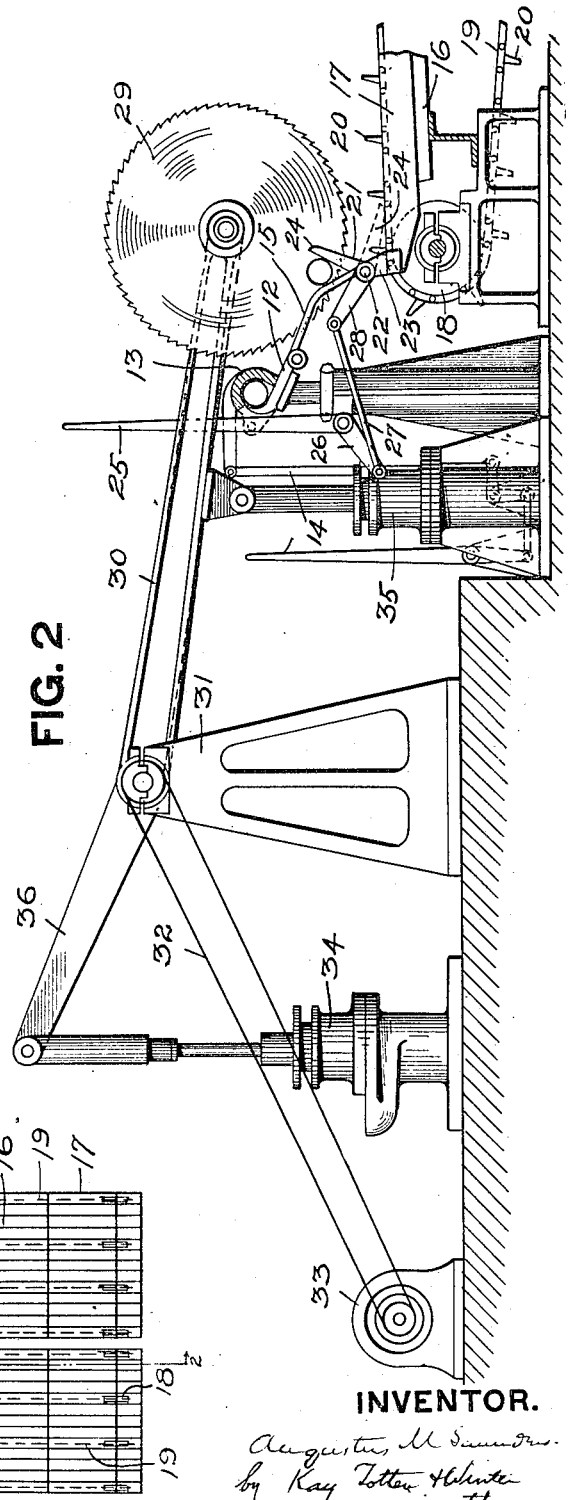
WITNESSES. INVENTOR.

UNITED STATES PATENT OFFICE.

AUGUSTUS M. SAUNDERS, OF McKEESPORT, PENNSYLVANIA, ASSIGNOR TO NATIONAL TUBE CO., OF PITTSBURG, PENNSYLVANIA, A CORPORATION OF NEW JERSEY.

APPARATUS FOR THE MANUFACTURE OF PIPE.

No. 825,487.      Specification of Letters Patent.      Patented July 10, 1906.

Application filed January 23, 1904. Serial No. 190,329.

*To all whom it may concern:*

Be it known that I, AUGUSTUS M. SAUNDERS, a resident of McKeesport, in the county of Allegheny and State of Pennsylvania, have invented a new and useful Improvement in Apparatus for the Manufacture of Pipe; and I do hereby declare the following to be a full, clear, and exact description thereof.

My invention relates to the manufacture of welded tubing, and has special reference to the manufacture of what is known as "double-length" tubing, where the tube is welded in double the ordinary standard length and is severed during finishing into two tubes of the ordinary standard length, its object being to provide for the quick handling of the welded tube.

In Letters Patent to Peter Patterson, No. 715,854, of December 16, 1902, is described apparatus for the manufacture of such tubing in which the welded double-length tube is passed into a feeding-trough and fed to the finishing-rolls and is either severed into two sections before passing through the sizing-rolls, or, if cross-rolls are employed, before passing through the cross-rolls. In employing this apparatus on certain classes of tubing some difficulty has been experienced consequent the stopping of the tube for sawing and the subsequent feeding of the two sections formed from the single welded tube successively along the same course and through the finishing-rolls.

The object of the present invention is to overcome difficulties of this character and to provide for the quick finishing of the double-length tubing and its reduction to sections of proper length; and to these ends it consists, generally stated, in the combination with the welding-surface and welding apparatus in front of the same, of finishing-rolls adapted to receive and finish the welded tube, a final receiving-trough back of and in line with the finishing-rolls, a tube-support beside the final receiving-trough, and a saw adapted to cut the tube into sections when supported thereby.

It also consists in certain improvements in such support, the same being formed of a series of reciprocating arms or levers adapted to intercept the tube when passing from the final receiving-trough, hold it during sawing, and deliver it onto a tube-receiver, such as the cooling-table.

To enable others skilled in the art to make and use my invention, I will describe the same more fully, referring to the accompanying drawings, in which—

Figure 1 is a plan view of a plant for the manufacture of tubing embodying the invention. Fig. 2 is an enlarged cross-section on the line 2 2, Fig. 1.

In the accompanying drawings the furnace 2 is of any suitable construction, being preferably of a regenerative type and long enough to heat blanks of double the ordinary standard length, the furnace being about forty (40) to forty-five (45) feet in length. Mounted in front of the same is any suitable tube-welding apparatus 3, that illustrated in the drawings being the usual swinging draw-bench used for the making of butt-weld pipe, the bench being pivoted at the rear end 4 and having a continuously-running draw-chain 5, the tube-blanks to be welded being connected thereto by means of the tongs 6 and drawn through a welding-bell which is held in the bell-holder 6ª at the front end of the bench. At the side of this draw-bench is the sizing-roll trough 7 in line with the sizing-rolls 8, which deliver the tube into the cross-roll trough 9, from which the tube passes through the cross-rolls 10 into the final receiving-trough 11. This trough in its preferred construction is provided with the inclined bottom portion 12 with the curved cover 13 hinged at the upper and outer edge of the trough and having suitable lever connections 14, by which the trough may be opened, so as to discharge the tube in a downward direction over the inclined bottom 12 to a suitable tube-support at the side of the final receiving-trough 11, by which the pipe is supported during sawing. In the preferred construction the tube is discharged from the final receiving-trough and onto the inclined skids 15, which extend down to a suitable cooling-table 16, on which the tubes are carried in slow course to permit the proper cooling thereof.

The cooling-table shown is provided with inclined bars 17 and has suitable sprocket-wheels 18, around which pass the endless chains 19, carrying the fingers 20, there being a series of these chains carrying fingers in line with each other extending across the cooling-table and adapted to carry the tubes in straight course during cooling. Between the final receiving-trough 11 and cooling-table are located suitable pipe-supports 21, adapted to intercept the pipe and hold it during sawing. Such pipe-supports are illustrated as elbow-levers pivoted at 22 on standards 23, extending up from the frame of the cooling-table and in normal position their finger ends 24, extending up in position to intercept and hold the pipe as it passes down the inclined skids 15. These pivoted pipe-supports are operated by any suitable mechanism, that shown being the hand-lever 25, having the arm 26 connected by a suitable strap 27 to the rear arm 28 of the pipe-support 21, so that by the rocking of the lever 25 the pipe-support 21 may be rocked forward into the position indicated by dotted lines and discharge the pipe onto the cooling-table, being then raised in position to receive the next pipe. Located about midway of the length of the final receiving-trough 11 is the saw 29, carried on the saw-frame 30, mounted in bearings 31 back of the final receiving-trough, this swinging saw being shown as driven by suitable belt 32 from a motor 33.

In order to raise and lower the saw 29, any suitable mechanism may be employed, and to hold the same fully under control I prefer the two hydraulic rams 34 35, one located between the bearing 31 and the saw 29 and connected to an extension 36 of said lever. By means of these hydraulic cylinders the swing of the saw can be accurately controlled both for quick action and to prevent undue swing of the saw and its frame.

In the employment of the above invention the tube-blanks, either in plate or strip form or previously bent into U or tubular skelp form, are preferably fed into the rear end of the furnace, and when the invention is employed in the making of butt-weld tubing being preferably fed into final heating position, and as their edges are brought to proper welding heat the blanks are grasped by suitable tongs 6, the welding-belt thrown over the same, the tongs connected to the draw-chain of the welding apparatus, and the blanks thus drawn through the welding-bells, which are caught in the bell-holder 6ª. The tongs are then disengaged from the welded tube, which is fed to the sizing-rolls—for example, being passed sidewise into the trough 7—then fed through the sizing-rolls 8, which deliver the tube into the cross-roll trough 9, from which the tube passes through the cross-rolls 10 and into the final receiving-trough 11. In the manufacture of double-length tubing it is found that with some of the larger sizes of pipe the pipe can be cross-rolled before it is cut into lengths, and in passing along the course above described the pipe must be carried quickly and without delay through both the sizing-rolls and cross-rolls, any delays and accidents caused by the blanks being stopped in their course and cut to length, and then being fed successively to the same finishing-rolls being thus avoided. To properly support the tube during this cross-rolling operation and thereafter when cross-rolling these long lengths, it is necessary that the tube shall be entirely inclosed within the final receiving-trough to prevent whipping action caused by the rotation of the long hot flexible tube. For this purpose the closed or inclosing final receiving-trough 11 is employed; but it is desirable to deliver the tube from this final receiving-trough as quickly as practicable, especially where the furnace is running rapidly, so as to leave it free to receive the next tube. This is accomplished with the present apparatus by opening the final receiving-trough immediately after the pipe leaves the cross-rolls, when the tube will slide down the skids 15 until caught by the supports 21, which, as illustrated, form the tube-support beside the final receiving-trough, and the trough 11 can be immediately closed, ready to receive the next tube.

As soon as the tube is caught by said supports 21 the operator lowers the saw 29, which cuts the blank into two sections, when, through the lever 25 and the connections with said supports, the two sections of tubing formed from the single-welded tube are quickly discharged by the rocking of the elbow-lever forming the support 21 onto the cooling-table 16, the support being then swung back into position ready to receive the next tube. The apparatus therefore provides for the very quick handling of the tube-blanks, there being no interference with the movement of the blank in its regular course from the welding apparatus through the finishing-rolls and its discharge from the same, as the cutting of the long tube into lengths occurs after the blanks is delivered from the finishing apparatus.

The invention has the further advantage that the tube is cut into sections while it is still at a high heat and at a heat high enough to provide for cutting the same by means of a hot saw, which requires less power than what is termed a "cold" saw, which must be used when the tubes are cooled down below a red heat.

What I claim is—

1. In apparatus for the manufacture of double-length tubing, the combination with finishing-rolls, of a receiving-trough back of and in line with the finishing-rolls and having a side delivery, a tube-support beside the receiving-trough, and a saw adapted to cut the tube into sections when held by said tube-support.

2. In apparatus for the manufacture of double-length tubing, the combination with finishing-rolls, of a receiving-trough back of and in line with the finishing-rolls and having a side delivery, a tube-receiver at the side of said trough, a movable tube-support between the final receiving-trough and the tube-receiver adapted to receive the tube from the final receiving-trough and deliver it to the tube-receiver, and a saw adapted to cut the tube into sections when held by said tube-support.

3. In apparatus for the manufacture of double-length tubing, the combination with finishing-rolls, of a receiving-trough back of and in line with the finishing-rolls and having a side delivery, a tube-receiver at the side of said trough, a pivoted tube-support adapted to swing across the course of the tube between the trough and tube-receiver, and a saw adapted to cut the tube into sections when held by said tube-support.

4. In apparatus for the manufacture of double-length tubing, the combination with finishing-rolls, of a receiving-trough back of and in line with the finishing-rolls and having a side delivery, a tube-receiver at the side of said trough, pivoted tube-supports between the final receiving-trough and the tube-receiver, said supports being formed of elbow-levers having fingers adapted to pass across the course of the tube between the trough and tube-receiver and swing in downwardly-inclined position to deliver the tube to the tube-receiver, and a saw adapted to cut the tube into sections when supported by said fingers.

In testimony whereof I, the said AUGUSTUS M. SAUNDERS, have hereunto set my hand.

AUGUSTUS M. SAUNDERS.

Witnesses:
  JAMES I. KAY,
  ROBERT C. TOTTEN.